US012694880B2

(12) United States Patent
Eksler

(10) Patent No.: US 12,694,880 B2
(45) Date of Patent: Jul. 28, 2026

(54) METHOD AND DEVICE FOR AUDIO BAND-WIDTH DETECTION AND AUDIO BAND-WIDTH SWITCHING IN AN AUDIO CODEC

(71) Applicant: VOICEAGE CORPORATION, Québec (CA)

(72) Inventor: Vaclav Eksler, Brno (CZ)

(73) Assignee: VOICEAGE CORPORATION (CA)

( * ) Notice: Subject to any disclaimer, the term of this patent is extended or adjusted under 35 U.S.C. 154(b) by 149 days.

(21) Appl. No.: 18/030,891

(22) PCT Filed: Oct. 14, 2021

(86) PCT No.: PCT/CA2021/051442
§ 371 (c)(1),
(2) Date: Apr. 7, 2023

(87) PCT Pub. No.: WO2022/077110
PCT Pub. Date: Apr. 21, 2022

(65) Prior Publication Data

US 2023/0368803 A1 Nov. 16, 2023

Related U.S. Application Data

(60) Provisional application No. 63/092,178, filed on Oct. 15, 2020.

(51) Int. Cl.
*G10L 19/008* (2013.01)
*G10L 19/22* (2013.01)
(Continued)

(52) U.S. Cl.
CPC ............ *G10L 19/008* (2013.01); *G10L 19/22* (2013.01); *G10L 25/18* (2013.01); *G10L 25/27* (2013.01)

(58) Field of Classification Search
CPC ....... G10L 19/008; G10L 19/22; G10L 25/18; G10L 25/27
See application file for complete search history.

(56) References Cited

U.S. PATENT DOCUMENTS

| | | | |
|---|---|---|---|
| 7,164,659 | B2 | 1/2007 | LeBlanc |
| 7,701,954 | B2 | 4/2010 | Robenko et al. |

(Continued)

FOREIGN PATENT DOCUMENTS

| | | |
|---|---|---|
| CN | 20090318 | 11/2010 |
| CN | 107408389 | 11/2017 |

(Continued)

OTHER PUBLICATIONS

Eksler, Václav, Milan Jelínek, and Wolfgang Jaegers, "Audio Bandwidth Detection in the EVS Codec", Dec. 2015, 2015 IEEE Global Conference on Signal and Information Processing (GlobalSIP), pp. 488-492. IEEE. (Year: 2015).*

(Continued)

*Primary Examiner* — Daniel C Washburn
*Assistant Examiner* — James Boggs
(74) *Attorney, Agent, or Firm* — K&L GATES LLP

(57) ABSTRACT

A method and device detect, in an encoder part of a sound codec, an audio band-width of a sound signal to be coded. The device comprises an analyser of the sound signal and a final audio band-width decision module for delivering a final decision about the detected audio band-width using the result of the analysis of the sound signal. In the encoder part, the final audio band-width decision module is located upstream of the sound signal analyser. Also, a method and device switch from a first audio band-width to a second audio band-width of the sound signal. In the encoder part, the device comprises a final audio band-width decision module for delivering a final decision about a detected audio (Continued)

band-width of the sound signal to be coded, a counter of frames where audio band-width switching occurs in response to the detected audio band-width final decision, and an attenuator responsive to the counter of frames for attenuating the sound signal prior to encoding there of.

30 Claims, 9 Drawing Sheets

(51) Int. Cl.
*G10L 25/18* (2013.01)
*G10L 25/27* (2013.01)

(56) References Cited

U.S. PATENT DOCUMENTS

| | | | | |
|---|---|---|---|---|
| 7,860,709 | B2 * | 12/2010 | Makinen | G10L 19/022 704/E19.01 |
| 8,254,404 | B2 | 8/2012 | Robenko et al. | |
| 10,219,147 | B2 * | 2/2019 | Johansson | H04W 8/22 |
| 10,319,384 | B2 * | 6/2019 | Grill | G10L 19/173 |
| 10,424,306 | B2 * | 9/2019 | Greer | G10L 19/24 |
| 10,803,877 | B2 * | 10/2020 | Sung | G10L 21/0208 |
| 11,462,226 | B2 * | 10/2022 | Schnell | H03M 7/3062 |
| 2005/0267742 | A1 | 12/2005 | Makinen | |
| 2011/0200198 | A1 | 8/2011 | Grill et al. | |
| 2011/0202354 | A1 | 8/2011 | Grill et al. | |
| 2012/0265523 | A1 | 10/2012 | Greer et al. | |
| 2019/0027156 | A1 | 1/2019 | Sung et al. | |
| 2019/0259404 | A1 | 8/2019 | Srinivasan et al. | |

FOREIGN PATENT DOCUMENTS

| | | |
|---|---|---|
| CN | 109313908 | 2/2019 |
| EP | 2584561 | 4/2013 |
| WO | JP2011161886 | 12/2011 |
| WO | 2017049397 A1 | 3/2017 |

OTHER PUBLICATIONS

Bruhn, Stefan, Harald Pobloth, Markus Schnell, Bernhard Grill, Jon Gibbs, Lei Miao, Kari Järvinen et al., "Standardization of the new 3GPP EVS codec", Apr. 2015, 2015 IEEE International Conference on Acoustics, Speech and Signal Processing (ICASSP 2015), pp. 5703-5707. (Year: 2015).*

Dietz, Martin et al.; "Overview of the EVS Codec Architecture"; 2015 IEE International Conference on Acoustics, Speech and Signal Processing (ICASSP); (2015); pp. 5698-5702.

Extended European Search Report for European Patent Application No. 21878827.1; date of completion of the search Jul. 17, 2024; (6 pages).

Baumgarte, Frank et al.; "Binaural Cue Coding—Part I: Psycho-acoustic Fundamentals and Design Principles"; IEEE Transactions on Speech and Audio Processing; vol. 11; No. 6; (2003); pp. 509-519.

Eksler, Václav Eksler et al.; "Audio Bandwidth Detection in the EVS Codec"; Symposium on 3GPP Enhanced Voice Services; (2015); pp. 488-492.

Herre, Jürgen et al.; "MPEG-H Audio—The New Standard for Universal Spatial/3D Audio Coding"; J. Audio Eng. Soc.; vol. 62; No. 12; (2014); pp. 821-830.

Neuendorf, Max et al.; "The ISO/MPEG Unified Speech and Audio Coding Standard—Consistent High Quality for all Content Types and at all Bit Rates"; J. Audio Eng. Soc.; vol. 61; No. 12; (2013); pp. 956-977.

Pulkki, Ville et al.; "Directional Audio Coding: Filterbank and STFT-based Design"; Audio Engineering Society, Convention Paper 6658; (2006); pp. 1-12.

3GPP SA4 contribution S4-170749, "New WID on EVS Codec Extension for Immersive Voice and Audio Services", SA4 meeting #94, Jun. 26-30, 2017, http://www.3gpp.org/ftp/tsg_sa/WG4_CODEC/TSGS4_94/Docs/S4-170749.zip.

3GPP SA4 contribution S4-180462, "On spatial metadata for IVAS spatial audio input format", SA4 meeting #98, Apr. 9-13, 2018, https://www.3gpp.org/ftp/tsg_sa/WG4_CODEC/TSGS4_98/Docs/S4-180462.zip.

3GPP TS 26.445, v.16.1.0, "Codec for Enhanced Voice Services (EVS); Detailed Algorithmic Description", Jul. 2020.

PCT International Search Report and PCT Written Opinion for PCT International Application No. PCT/CA2021/051422; date of mailing Feb. 3, 2022; (10 pages).

English translation of Japanese Office Action for Japanese Patent Application No. 2023-523155; mailing date Oct. 7, 2025, (7 pages).

English translation of Chinese Office Action for Chinese Patent Application No. 202180070612.6, mailing date Jan. 30, 2026, (19 pages).

English Translation of Chinese Notice of Allowance for Chinese Patent Application No. 2020180070612.6, dated Jun. 8, 2026, (3 pages).

* cited by examiner

METHOD AND DEVICE FOR AUDIO BAND-WIDTH DETECTION AND AUDIO BAND-WIDTH SWITCHING IN AN AUDIO CODEC

CROSS REFERENCE TO RELATED APPLICATIONS

This is the national phase under 35 U.S.C. § 371 of International Application No. PCT/CA2021/051442 filed on Oct. 14, 2021, which claims priority to and the benefit of U.S. Provisional Patent Application No. 63/092,178 filed on Oct. 15, 2020, the entire disclosures of each of which are incorporated by reference herein.

TECHNICAL FIELD

The present disclosure relates to sound coding, in particular but not exclusively to a method and device for audio band-width detection and a method and device for audio band-width switching in a sound codec.

In the present disclosure and the appended claims:

The term "sound" may be related to speech, audio and any other sound;

The term "stereo" is an abbreviation for "stereophonic"; and

The term "mono" is an abbreviation for "monophonic".

BACKGROUND

Historically, conversational telephony has been implemented with handsets having only one transducer to output sound only to one of the user's ears. In the last decade, users have started to use their portable handset in conjunction with a headphone to receive the sound over their two ears mainly to listen to music but also, sometimes, to listen to speech. Nevertheless, when a portable handset is used to transmit and receive conversational speech, the content is still mono but presented to the user's two ears when a headphone is used.

With the newest 3GPP (3rd Generation Partnership Project) speech coding standard, Codec for Enhanced Voice Services (EVS), as described in Reference [1], of which the full content is incorporated herein by reference, the quality of the coded sound, for example speech and/or audio that is transmitted and received through a portable handset has been significantly improved. The next natural step is to transmit stereo information such that the receiver gets as close as possible to a real life audio scene that is captured at the other end of the communication link.

In audio codecs, transmission of stereo information is normally used.

For conversational speech codecs, mono signal is the norm. When a stereo signal is transmitted, the bitrate often needs to be doubled since both the left and right channels of the stereo signal are coded using a mono codec. To reduce the bitrate, efficient stereo coding techniques have been developed and used. As non-limitative examples, the use of stereo coding techniques is discussed in the following paragraphs.

A first stereo coding technique is called parametric stereo. Parametric stereo encodes two, left and right channels as a mono signal using a common mono codec plus a certain amount of stereo side information (corresponding to stereo parameters) which represents a stereo image. The two input left and right channels are down-mixed into the mono signal, and the stereo parameters are then computed usually in transform domain, for example in the Discrete Fourier Transform (DFT) domain, and are related to so-called binaural or inter-channel cues. The binaural cues (Reference [3], of which the full content is incorporated herein by reference) comprise Interaural Level Difference (ILD), Interaural Time Difference (ITD) and Interaural Correlation (IC). Depending on the signal characteristics, stereo scene configuration, etc., some or all binaural cues are coded and transmitted to the decoder. Information about what binaural cues are coded and transmitted is sent as signaling information, which is usually part of the stereo side information. A particular binaural cue can be also quantized using different coding techniques which results in a variable number of bits being used. Then, in addition to the quantized binaural cues, the stereo side information may contain, usually at medium and higher bitrates, a quantized residual signal that results from the down-mixing. The residual signal can be coded using an entropy coding technique, e.g. an arithmetic encoder. In general, the parametric stereo coding is most efficient at lower and medium bitrates. Parametric stereo with parameters computed in the DFT domain will be referred to in this disclosure as DFT stereo.

Another stereo coding technique is a technique operating in time-domain. This stereo coding technique mixes the two input, left and right channels into so-called primary channel and secondary channel. For example, following the method as described in Reference [4], of which the full content is incorporated herein by reference, time-domain mixing can be based on a mixing ratio, which determines respective contributions of the two input, left and right channels upon production of the primary channel and the secondary channel. The mixing ratio is derived from several metrics, e.g. normalized correlations of the input left and right channels with respect to a mono version of the stereo sound signal or a long-term correlation difference between the two input left and right channels. The primary channel can be coded by a common mono codec while the secondary channel can be coded by a lower bitrate codec. The secondary channel coding may exploit coherence between the primary and secondary channels and might re-use some parameters from the primary channel. The time-domain stereo will be referred to in this disclosure as TD stereo. In general, TD stereo is most efficient at lower and medium bitrates for coding speech signals.

A third stereo coding technique is a technique operating in the Modified Discrete Cosine Transform (MDCT) domain. It is based on joint coding of both left and right channels while computing global ILD and Mid/Side (M/S) processing in whitened spectral domain. It uses several tools adapted from TCX (Transform Coded eXcitation) coding in MPEG (Moving Picture Experts Group) codecs as described for example in References [7] and [8] of which the full contents are incorporated herein by reference, e.g. TCX core coding, TCX LTP (Long-Term Prediction) analysis, TCX noise filling, Frequency-Domain Noise Shaping (FDNS), stereophonic Intelligent Gap Filling (IGF), and/or adaptive bit allocation between channels. In general, this third stereo coding technique is efficient to encode all kinds of audio content at medium and high bitrates. The MDCT domain stereo coding technique will be referred to in this disclosure as MDCT stereo.

Further, in last years, the generation, recording, representation, coding, transmission, and reproduction of audio is moving towards enhanced, interactive and immersive experience for the listener. The immersive experience can be described, for example, as a state of being deeply engaged or involved in a sound scene while sounds are coming from all directions. In immersive audio (also called 3D (Three-Dimensional) audio), the sound image is reproduced in all three dimensions around the listener, taking into consideration a wide range of sound characteristics like timbre, directivity, reverberation, transparency and accuracy of (auditory) spaciousness. Immersive audio is produced for a particular sound playback or reproduction system such as loudspeaker-based-system, integrated reproduction system (sound bar) or headphones. Then, interactivity of a sound reproduction system may include, for example, an ability to adjust sound levels, change positions of sounds, or select different languages for the reproduction.

There exist three fundamental approaches to achieve an immersive experience.

A first approach to achieve an immersive experience is a channel-based audio approach using multiple spaced microphones to capture sounds from different directions, wherein one microphone corresponds to one audio channel in a specific loudspeaker layout. Each recorded channel is then supplied to a loudspeaker in a given location. Examples of channel-based audio approaches are, for example, stereo, 5.1 surround, 5.1+4, etc. In general, channel-based audio is coded by multiple core coders where the number of core coders usually corresponds to the number of recorded channels. For example, the channels are coded by multiple stereo coders using e.g. TD stereo or MDCT stereo coding technique. The channel-based audio will be referred to in this disclosure as Multi-Channel (MC) format approach.

A second approach to achieve an immersive experience is a scene-based audio approach which represents a desired sound field over a localized space as a function of time by a combination of dimensional components. The sound signals representing the scene-based audio (SBA) are independent of the positions of the audio sources while the sound field is transformed to a chosen layout of loudspeakers at the renderer. An example of scene-based audio is ambisonics. There exist several SBA coding techniques while the most known is probably Directional Audio Coding (DirAC) as described for example in Reference [6] of which the full content is incorporated herein by reference. A DirAC encoder uses an analysis of ambisonics input signals in Complex Low Delay Filter Bank (CLDFB) domain, estimates spatial parameters (metadata) like direction and diffuseness grouped in time and frequency slots, and downmixes input channels into a lower number of so-called transport channels (typically 1, 2, or 4 channels). A DirAC decoder then decodes spatial metadata, derives direct and diffuse signals from transport channels and renders them into loudspeaker or headphone setups to accommodate different listening configurations. Another example of SBA coding technique, targeting mostly mobile capture devices, is Metadata-Assisted Spatial Audio (MASA) format as described for example in Reference [9] of which the full content is incorporated herein by reference. In the MASA approach, the MASA metadata (e.g. direction, energy ratio, spread coherence, distance, surround coherence, all in several time-frequency slots) are generated in a MASA analyzer, quantized, coded, and passed into the bit-stream while MASA audio channel(s) are treated as mono or multi-channel transport signals coded by the core encoder(s). At the MASA decoder, MASA metadata then guide the decoding and rendering process to recreate the output spatial sound.

The third approach to achieve an immersive experience is an object-based audio approach which represents an auditory scene as a set of individual audio elements (for example singer, drums, guitar, etc.) accompanied by information such as their position, so they can be rendered (translated) by a sound reproduction system at their intended locations. This gives the object-based audio approach a great flexibility and interactivity because each object is kept discrete and can be individually manipulated. Each audio object consists of an audio stream, i.e. a waveform, with associated metadata and can be thus seen also as an Independent Stream with metadata (ISm).

Each of the above described audio approaches to achieve an immersive experience presents pros and cons. It is thus common that, instead of only one audio approach, several audio approaches are combined in a complex audio system to create an immersive auditory scene. An example can be an audio system that combines scene-based or channel-based audio with object-based audio, for example ambisonics with a few discrete audio objects.

In recent years, 3GPP (3rd Generation Partnership Project) started working on developing a 3D (Three-Dimensional) sound codec for immersive services called IVAS (Immersive Voice and Audio Services), based on the EVS codec (See Reference [5] of which the full content is incorporated herein by reference).

SUMMARY

According to a first aspect, the present disclosure relates to a device for detecting, in an encoder part of a sound codec, an audio band-width of a sound signal to be coded, comprising: an analyser of the sound signal; and a final audio band-width decision module for delivering a final decision about the detected audio band-width; wherein, in the encoder part of the sound codec, the final audio band-width decision module is located upstream of the sound signal analyser.

According to a second aspect, the present disclosure provides a method for detecting, in an encoder part of a sound codec, an audio band-width of a sound signal to be coded, comprising: analysing the sound signal; and finally deciding about the detected audio band-width using the result of the analysis of the sound signal; wherein, in the encoder part of the sound codec, the final decision about the detected audio band-width is made upstream of the analysis of the sound signal.

The present disclosure is also concerned with a device for switching from a first audio band-width to a second audio band-width of a sound signal to be coded, comprising, in an encoder part of a sound codec: a final audio band-width decision module for delivering a final decision about a detected audio band-width of the sound signal to be coded; a counter of frames where audio band-width switching occurs, the counter of frames being responsive to the detected audio band-width final decision from the final audio band-width decision module; and an attenuator responsive to the counter of frames for attenuating the sound signal prior to encoding of the sound signal.

According to a still further aspect, the present disclosure provides a method for switching from a first audio band-width to a second audio band-width of a sound signal to be coded, comprising, in an encoder part of a sound codec: delivering a final decision about a detected audio band-width of the sound signal to be coded; counting frames where audio band-width switching occurs in response to the detected audio band-width final decision; and attenuating, in response to the count of frames, the sound signal prior to encoding of the sound signal.

The foregoing and other objects, advantages and features of the method and device for audio band-width detection and the method and device for audio band-width switching will become more apparent upon reading of the following non-restrictive description of illustrative embodiments thereof, given by way of example only with reference to the accompanying drawings.

DETAILED DESCRIPTION

Figure 1:
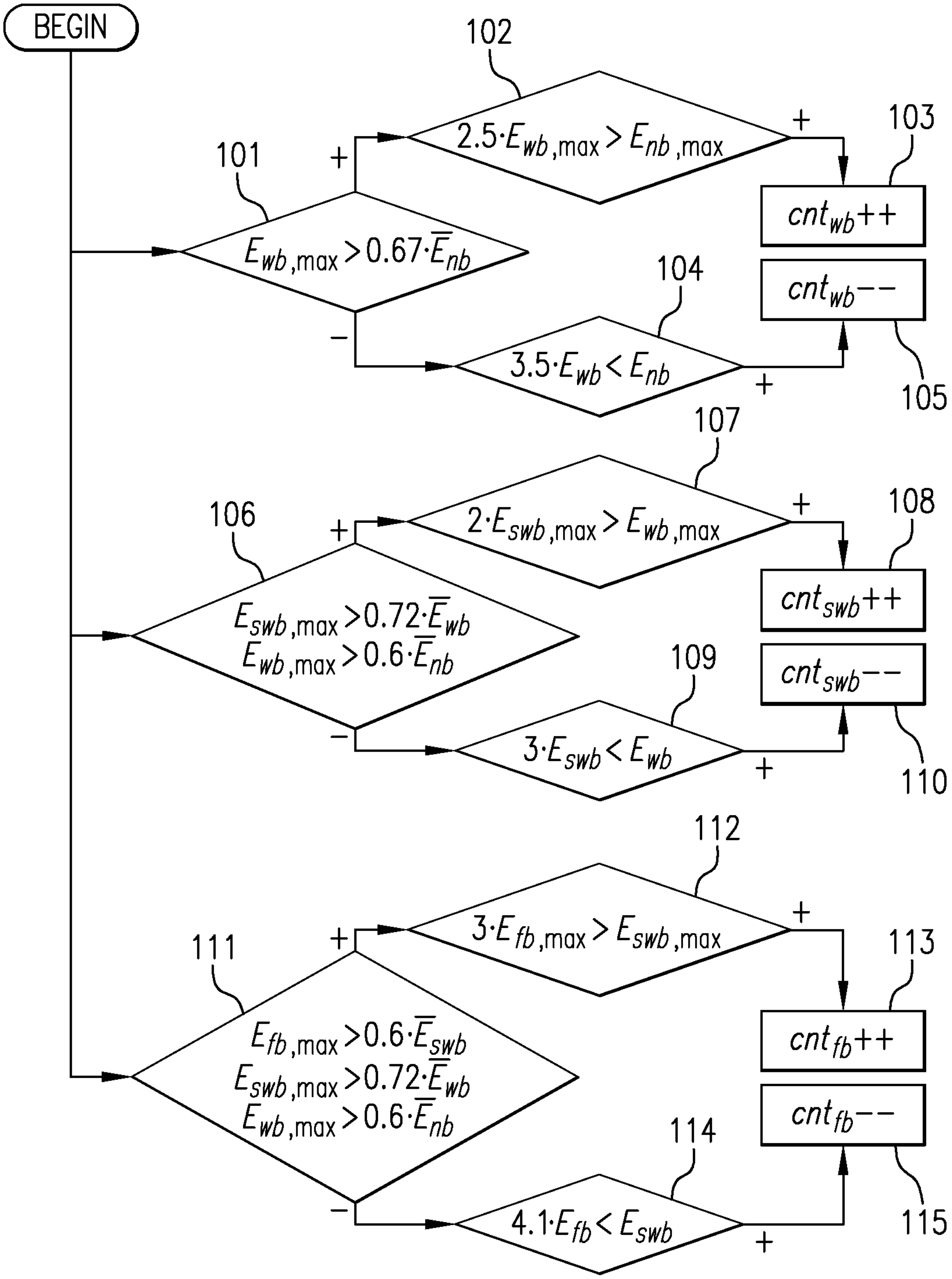
FIG. 1 is a schematic flow chart showing conditions for increasing or decreasing counters in audio band-width detection.

The present disclosure describes audio band-width detection and audio band-width switching techniques.

The audio band-width detection and audio band-width switching techniques are described, by way of non-limitative example only, with reference to an IVAS coding framework referred to throughout this disclosure as IVAS codec (or IVAS sound codec). However, it is within the scope of the present disclosure to incorporate such audio band-width detection and audio band-width switching techniques in any other sound codec.

1. Introduction

Specifically, the present disclosure describes a method and device for audio band-width detection using an audio band-width detection algorithm implemented in the IVAS codec baseline, and a method and device for audio band-width switching using an audio band-width switching algorithm also implemented in the IVAS codec baseline.

The Audio Band-width Detection (BWD) algorithm in IVAS is similar to the BWD algorithm in EVS and it is applied in its original form in ISm, DFT stereo and TD stereo modes. However, no BWD was applied in the MDCT stereo mode. In the present disclosure, a new BWD is described which is used in the MDCT stereo mode (including higher-bitrate DirAC, higher-bitrate MASA, and multi-channel format). The goal is to introduce the BWD to modes where it was missing (i.e. to use BWD consistently in all operating points) in IVAS.

The present disclosure further describes the Audio Band-width Switching (BWS) algorithm used in the IVAS coding framework while keeping the computational complexity as low as possible.

Traditionally, speech and audio codecs (sound codecs) generally expect to receive an input sound signal with an effective audio band-width being close to the Nyquist frequency. When the effective audio band-width of the input sound signal is significantly lower than the Nyquist frequency, these traditional codecs usually do not work optimally, because they waste a portion of the available bit budget to represent empty frequency bands.

Today codecs are designed to be flexible in terms of coding miscellaneous audio material at a large range of bitrates and band-widths. An example of state-of-the-art speech and audio codec is the EVS codec standardized in 3GPP [1]. This codec consists of a multi-rate codec capable of efficiently compressing voice, music, and mixed content signals. In order to keep a high subjective quality for all audio material it comprises a number of different coding modes. These modes are selected depending on a given bitrate, input sound signal characteristics (e.g. speech/music, voiced/unvoiced), signal activity, and audio band-width. In order to select the best coding mode, the EVS codec uses BWD. BWD in the EVS codec is designed to detect changes in the effective audio band-width of the input sound signal. Consequently, the EVS codec can be flexibly re-configured to encode only the perceptually meaningful frequency content and distribute the available bit budget in an optimal manner. In the present disclosure, the BWD used in the EVS codec is further elaborated in the context of the IVAS coding framework.

Reconfiguration of the codec as a consequence of the BWD change improves the codec's performance. However, this reconfiguration might introduce artifacts if the reconfiguration and its related coding mode switching is not carefully and properly treated. The artifacts are usually related to an abrupt change of the high-frequency (HF) content (in general, HF is intended to designate frequency content above 8 kHz). The disclosed Band-Width Switching (BWS) algorithm thus smooths switching and ensures that the BWD change is seamless and pleasant and not annoying.

2. Audio Band-width Detection (BWD)

2.1 Background

Figure 3A:
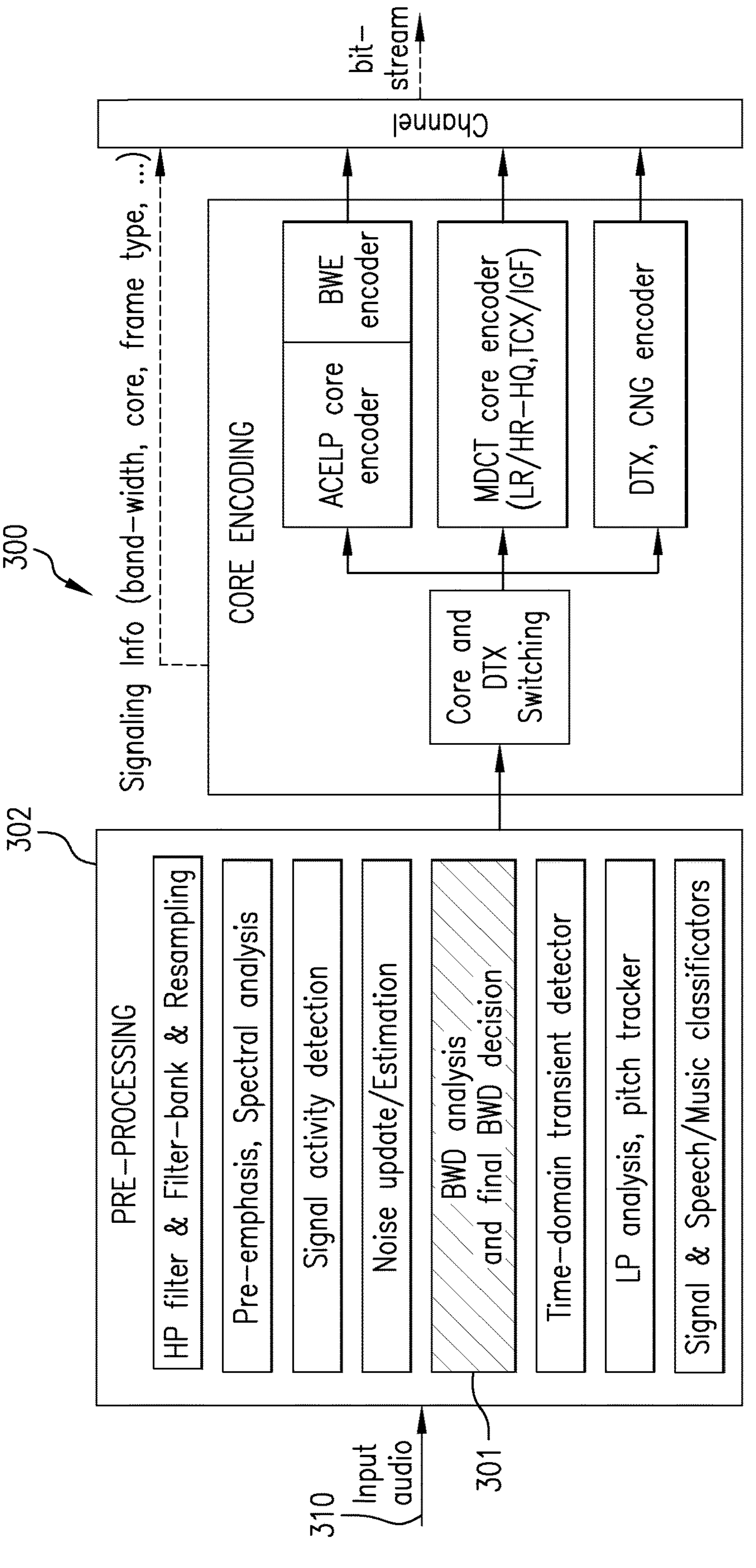
FIG. 3*a* is a schematic block diagram of the encoder part of a EVS sound codec using conventional audio band-width detection.
Figure 3B:
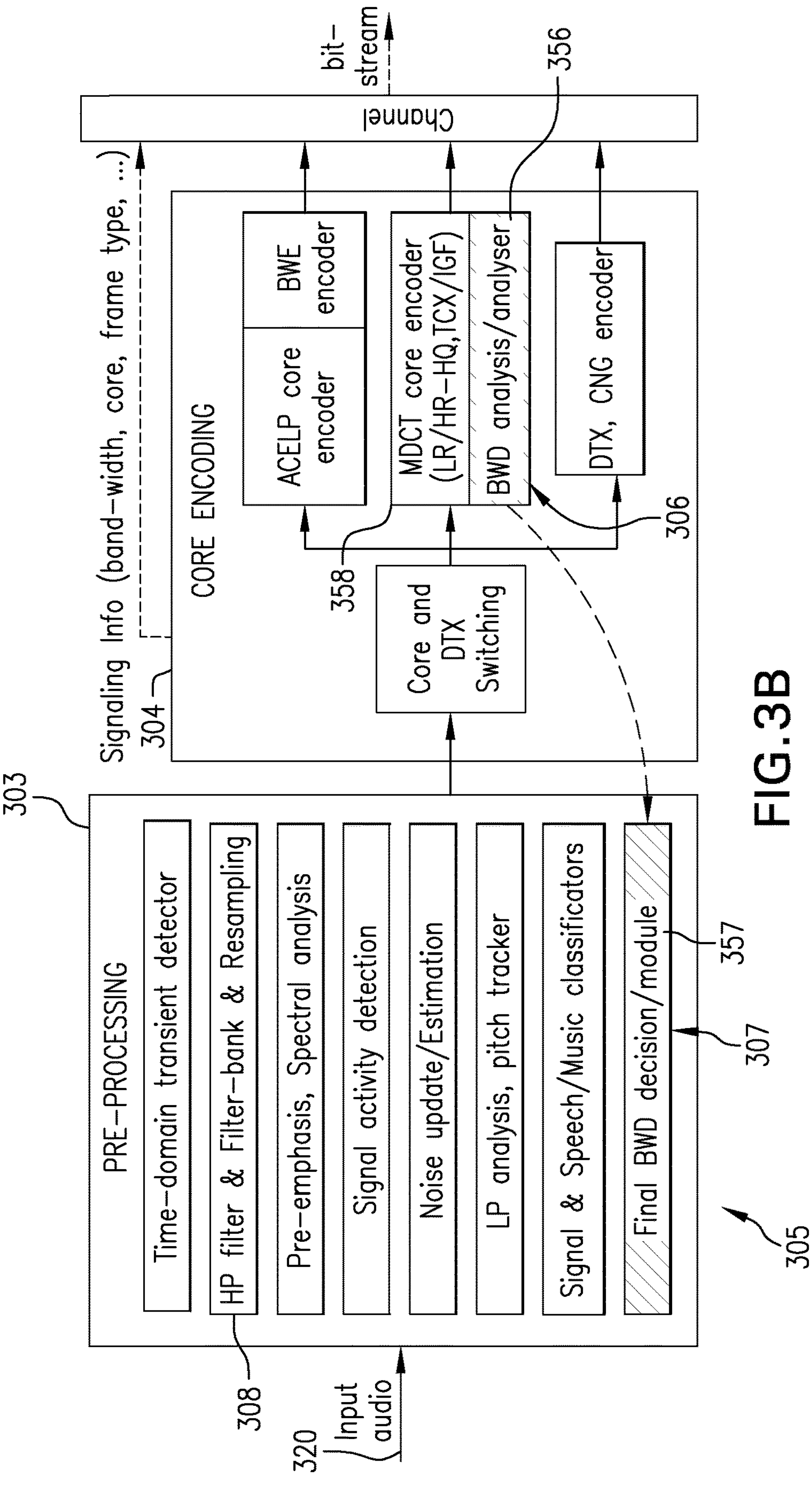
FIG. 3*b* is a schematic block diagram of the encoder part of an IVAS sound codec using the audio band-width detection method and device according to the present disclosure.

FIG. 3*a* is a schematic block diagram of the encoder part of a EVS sound codec using audio band-width detection, and FIG. 3*b* is a schematic block diagram of the encoder part of an IVAS sound codec using the audio band-width detection method and device according to the present disclosure. Specifically, FIG. 3*a* shows BWD implanted in the native EVS sound codec while FIG. 3*b* shows BWD according to the present disclosure implanted in MDCT stereo mode of an IVAS sound codec.

As illustrated in FIG. 3*a*, BWD 301, which is highlighted, forms part of the pre-processing stage 302 of the encoder part of the EVS codec 300 to detect the audio band-width (BVV) of the input sound signal 310. Additional information about the EVS sound codec including BWD can be found, for example, in Reference [1].

In FIG. 3*b*, BWD is also highlighted. As can be seen, the audio band-width detection method and device according to the present disclosure are integrated to the front pre-processing stage 303 and core encoding stage 304 of the encoder part of the IVAS codec 305 in order to detect the actual audio band-width (BVV) of the input sound signal 320 to be coded. This audio band-width information is used to run the IVAS codec 305 in its optimal configuration, tailored for a particular audio band-width rather than for a particular input sampling frequency. Thus, the available bit budget is distributed in the most optimal way and consequently increases significantly the coding efficiency. For example, if the input sampling frequency is 32 kHz but there is no "energetically" meaningful spectral content above 8 kHz, the codec can operate just in the wide-band mode while not wasting part of the bit budget to the higher band (above 8 kHz).

Additional information about the IVAS sound codec can be found, for example, in Reference [5].

The BWD algorithm in the IVAS codec 305 is based on computing energies in certain spectral regions and comparing them to certain thresholds. In the IVAS sound codec 305, the audio band-width detection method and device operate on the CLDFB values (ISm, TD stereo) or DFT values (DFT stereo). In the AMR-WB 10 (Adaptive MultiRage Wide-Band InterOperable) mode as described in Reference [1] in relation to the EVS codec, the audio band-width detection method and device use DCT transform values to determine the input sound signal audio band-width.

The BWD algorithm itself comprises several operations:

1) computation of mean and maximum energy values in a number of spectral regions of the input sound signal 320;
2) updating long-term parameters and counters; and
3) final decision about the detected and thus coded audio band-width.

The above two first operations 1) and 2) are integrated into an operation 306 of BWD analysis performed by a BWD analyser 356 integrated to the sound signal core encoding stage 304, and the last operation 3) forms an operation 307 of final BWD decision performed by a final audio band-width decision module (processor) 357 integrated to the sound signal pre-processing stage 303. As can be seen in FIG. 3*b*), the final audio band-width decision module 357 is located upstream of the BWD analyser 356 in the encoder part of the sound codec 305. Although the operations of the EVS native algorithm associated to BWD are referred to and introduced herein after, a detailed description thereof can be found in Sections 5.1.6 and 5.1.7 of Reference [1].

In the description below, as a non-limitative example of implementation, the following audio band-widths/modes are defined: narrow-band (NB, 0-4 kHz), wide-band (WB, 0-8 kHz), super-wide-band (SWB, 0-16 kHz) and full-band (FB, 0-24 kHz).

2.2 BWD Signals

In order to keep the BWD algorithm computationally efficient, the method and device for audio band-width detection reuses as much as possible signal buffers and parameters available from the earlier EVS pre-processing stage (see Reference [1]). In the EVS primary mode this comprises complex modulated low delay filter bank (CLDFB) values, a local VAD parameter (i.e. voice activity decision without hangover), and a long-term estimate of the total noise energy as discussed below.

The CLDFB (see 308 in FIG. 3*b*) of the IVAS codec generates a time-frequency matrix from the input sound signal 320. The matrix may, for example, be composed of 16 time slots and several frequency sub-bands, where the width of each sub-band is 400 Hz. The number of the frequency sub-bands depends on the sampling rate of the input sound signal 320.

On the other hand, the CLDFB module is not present in the EVS AMR-WB IO mode where the Discrete Cosine Transform (DCT) is computed to determine the input signal audio band-width in the BWD. The DCT values are obtained by first applying a Hanning window to, in the non-restrictive example of implementation, the 320 samples of the sound signal 320 sampled at the input sampling rate. Then the windowed signal is transformed to the DCT domain and finally is decomposed into several frequency sub-bands depending on the input sampling rate. It should be noted that a constant analysis window length is used over all sampling rates in order to keep the computational complexity reasonably low.

More details on BWD based on CLDFB is found in Reference [2], of which the full content is incorporated herein by reference.

In the MDCT stereo mode, the computationally demanding CLDFB is not needed which renders BWD based on CLDFB inefficient. Thus, a new BWD algorithm for MDCT stereo is disclosed herein, which saves a substantial amount of computational complexity of the CLDFB and BWD in the pre-processing stage 303.

The method and device for audio band-width detection in the MDCT stereo coding mode can lead to a higher quality, since bits are not assigned to the high-band part of the spectrum if it has no content or if the audio band-width is limited by a command-line or another external request. Moreover, the method and device for audio band-width detection are run continuously in order to ease a bitrate switching which involves switching between different stereo coding technologies. Further, the method and device for audio band-width detection in the MDCT stereo mode enables applying BWD in higher bitrate DirAC, higher bitrate MASA, and multichannel (MC) format.

The method and device for audio band-width detection in the MDCT stereo mode is described below.

2.3 BWD in MDCT Stereo

In order not to increase the computational complexity related to the BWD (including CLDFB or other transform), the BWD analyser 356 in the MDCT stereo mode is not applied in the front pre-processing stage 303 to the CLDFB values but is applied later in the TCX core encoder 358 to the present MDCT values.

The TCX core encoder 358 performs several operations: long MDCT based TCX transformation (TCX20)/short MDCT based TCX transformation (TCX10) switching decision, core signal analysis (TCX-LTP, MDCT, Temporal Noise Shaping (TNS), Linear Prediction Coefficients (LPC) analysis, etc.), envelope quantization and FDNS, fine quantization of the core spectrum, and IGF (many of these operations are also part of the EVS codec, as described in Section 5.3.3.2 of Reference [1]). The core signal analysis includes a windowing and an MDCT calculation which are applied based on the transform and overlap lengths.

The method and device for audio band-width detection uses the MDCT spectrum as an input to the BWD algorithm. In order to simplify the algorithm, the operation 306 of BWD analysis is performed only in frames which are selected as TCX20 frames and are not transition frames; this means that BWD analysis is performed in frames of a given duration and is skipped in frames shorter and longer than this given duration. This ensures that the length of the MDCT spectrum always corresponds to the length of the frame in samples at the input sampling rate. Also, no BWD is applied in the Low-Frequency Effects (LFE) channel in the MC format mode; the LFE channel contains only low frequencies, e.g. 0-120 Hz, and, thus, does not require a full-range core encoder. Also, as well known in the art, the input sound signal 310/320 is sampled at a given sampling rate and processed by groups of these samples called "frames" divided into a number of "sub-frames".

In the case of the MDCT energy vector, there are nine frequency bands of interest whereby the width of each band is 1500 Hz. One to four frequency bands are assigned to each of the spectral regions as defined in Table 1.

TABLE 1

MDCT bands for energy calculation

| i | $idx_{start}$ | $idx_{end}$ | Band-width in kHz | spectral region |
|---|---|---|---|---|
| 0 | 1 | 1 | 1.5-3.0 | nb |
| 1 | 3 | 3 | 4.5-7.5 | wb |
| 2 | 4 | 4 | | |
| 3 | 6 | 6 | 9.0-15.0 | swb |
| 4 | 7 | 7 | | |
| 5 | 8 | 8 | | |
| 6 | 9 | 9 | | |
| 7 | 11 | 11 | 16.5-19.5 | fb |
| 8 | 12 | 12 | | |

In the above Table 1, nb (narrow-band), wb (wide-band), swb (super-wide-band) and fb (full-band), in lower-case letters, represent respective spectral regions, i is the index of the frequency band, $idx_{start}$ is an energy band start index, and $idx_{end}$ is an energy band end index.

2.3.1 MDCT Spectrum Energy Computation

The operation 306 of BWD analysis is slightly adjusted from the EVS native BWD algorithm (see Reference [1]) in the present disclosure to take into account the fact that the MDCT spectrum of length equal to the frame length in samples at the input sampling rate must be considered. Thus, the DCT based path of the EVS native BWD algorithm (as used in the EVS AMR-WB 10 mode) is employed while the former DCT spectrum length of 320 samples (which is the same at all input sampling rates in EVS) is scaled proportionally to the input sampling rate in MDCT stereo mode of IVAS.

The energy $E_{bin}(i)$ of the MDCT spectrum of the input sound signal 320 in the MDCT stereo mode is thus computed in the nine frequency bands as follows:

$$E_{bin}(i) = \sum_{k=idx_{start}(i)*b_{width}}^{k=idx_{end}(i)*b_{width}+b_{width}} S^2(k),\ i = 0,\ ..,\ 8,$$

where i is the index of the frequency band, S(k) is the MDCT spectrum, $idx_{start}$ is the energy band start index as defined in Table 1, $idx_{end}$ is the energy band end index as defined in Table 1, and the width of the energy band is $b_{width}$=60 samples (which corresponds to 1500 Hz regardless of the sampling rate).

The above calculation is implemented in the source code as follows, wherein the mark "###" identifies portions of the IVAS source code used in the method and device for audio band-width detection that are new with respect to the EVS source code:

```
void bw_detect(
  Encoder_State *st,   /* i/o: Encoder State   */
  const float signal_in[ ], /* i : input signal   */
  const int16_t localVAD, /* i : local VAD flag   */
```

-continued

```
  const float spectrum[ ], /* i : MDCT spectrum    */
  const float enerBuffer[ ] /* i : CLDFB energy buffer */
)
{
    #define BWD_TOTAL_WIDTH 320
  if ( enerBuffer != NULL ) /* CLDFB-based processing in EVS native
  mode */
  {
    ...
  }
  else
  {
    /* set width of a spectral bin (corresponds to 1.5kHz) */
    if ( st->input_Fs == 16000 )
    {
          bw_max = WB;
          bin_width = 60;
    }
    else if ( st->input_Fs == 32000 )
    {
          bw_max = SWB;
          bin_width = 30;
    }
    else /* st->input_Fs == 48000 */
    {
          bw_max = FB;
          bin_width = 20;
    }
###       if ( signal_in != NULL ) /* DCT-based processing in EVS
          AMR-WB IO */
###       {
          /* windowing of the input signal */
          pt = signal_in;
          pt1 = hann_window_320;
          /* 1st half of the window */
          for ( i = 0; i < BWD_TOTAL_WIDTH / 2; i++ )
          {
          in_win[i] =* pt++ ** pt1++;
          }
          pt1--;
          /* 2nd half of the window */
          for ( ; i < BWD_TOTAL_WIDTH; i++ )
          {
            in_win[i] = * pt++ * * pt1 --;
          }
          /* transform into frequency domain */
          edct( in_win, spect, BWD_TOTAL_WIDTH,
          st->element_mode );
###       }
###       else /* MDCT-based processing in IVAS */
###       {
###         bin_width *= ( st->input_Fs / 50 ) /
            BWD_TOTAL_WIDTH;
###         mvr2r( spectrum, spect, st->input_Fs / 50 );
###       }
    /* compute energy per spectral bins */
    set_f( spect_bin, 0.001f, n_bins );
    for ( k = 0; k <= bw_max; k++ )
    {
          for ( i = bwd_start_bin[k]; i <= bwd_end_bin[k]; i++ )
          {
            for ( j = 0; j < bin_width; j++ )
            {
              spect_bin[i] += spect[i * bin_width + j] * spect[i *
              bin_width + j];
            }
            spect_bin[i] = (float) log10( spect_bin[i] );
          }
    }
  }
  ...
}
```

2.3.2 Mean and Maximum Energy Values Per Frequency Band

The BWD analyser 356 converts energy values $E_{bin}(i)$ in the frequency bands to the log domain using, for example, the following relation:

$$E(i)=\log_{10}[E_{bin}(i)]\quad i=0,\ \ldots\ ,8, \tag{1}$$

where i is the index of the frequency band.

The BWD analyser 356 uses the log energies E(i) per frequency band to calculate mean energy values per spectral region using, for example, the following relations:

$$E_{nb}=E(0), \tag{2}$$
$$E_{wb}=\frac{1}{2}\sum_{i=1}^{2}E(i),$$
$$E_{swb}=\frac{1}{4}\sum_{i=3}^{6}E(i),$$
$$E_{fb}=\frac{1}{2}\sum_{i=7}^{8}E(i)$$

Finally, the BWD analyser 356 uses the log energies E(i) per frequency band to calculate the maximum energy values per spectral region using, for example, the following relations:

$$E_{nb,max}=E(0), \tag{3}$$
$$E_{wb,max}=\max_{i=1,2}E(i),$$
$$E_{swb,max}=\max_{i=3,\ldots,6}E(i),$$
$$E_{fb,max}=\max_{i=7,8}E(i)$$

where spectral regions nb, wb, swb and fb are defined in Table 1.

2.3.3 Long-Term Counters

The BWD analyser 356 updates long-term values of the mean energy values for the spectral regions nb, wb and swb using, for example, the following relations:

$$\bar{E}_{nb}=\lambda\cdot E_{nb}+(1-\lambda)\cdot\bar{E}_{nb}^{[-1]}, \tag{4}$$
$$\bar{E}_{wb}=\lambda\cdot E_{wb}+(1-\lambda)\cdot\bar{E}_{wb}^{[-1]},$$
$$\bar{E}_{swb}=\lambda\cdot E_{swb}+(1-\lambda)\cdot\bar{E}_{swb}^{[-1]}$$

where $\lambda=0.25$ is an example of update factor and the superscript $^{[-1]}$ denotes a parameter value from the previous frame. The update takes place only if the local VAD decision indicates that the input sound signal 320 is active or if the long-term background noise level is higher than 30 dB. This ensures that the parameters are updated only in frames having a perceptually meaningful content. Reference is made to [2] for additional information about the parameters/concept such as the local VAD decision, active signal, and long-term background noise.

The BWD analyser 356 then compares the long-term energy mean values from Equation (4) to certain thresholds while taking also into account the current maximum values per spectral regions from Equation (3). Depending on the result of the comparisons, the BWD analyser 356 increases or decreases counters for each spectral region wb, swb and fb as illustrated in FIG. 1. FIG. 1 is a schematic flow chart showing conditions for increasing or decreasing counters in the BWD analysis operation 306. For example, referring to FIG. 1:

- If "$E_{wb,max}>0.67\cdot\bar{E}_{nb}$" (see 101 in FIG. 1) and "$2.5\cdot E_{wb,max}>E_{nb,max}$" (see 102), a counter $cnt_{wb}$ is increased for example by "1" (see 103);
- If the condition "$E_{wb,max}>0.67\bar{E}_{nb}$" (see 101) is not met, and "$3.5\cdot E_{wb}<E_{nb}$" (see 104), the counter $cnt_{wb}$ is decreased for example by "1" (see 105);
- If "$E_{swb,max}>0.72\cdot\bar{E}_{wb}$" and "$E_{wb,max}>0.6\cdot E_{nb}$" (see 106) and "$2\cdot E_{swb,max}>E_{wb,max}$" (see 107), a counter $cnt_{swb}$ is increased for example by "1" (see 108);
- If the condition "$E_{swb,max}>0.72\cdot\bar{E}_{wb}$" and "$E_{wb,max}>0.6\cdot\bar{E}_{nb}$" (see 106) is not met, and "$3\cdot E_{swb}<E_{wb}$" (see 109), the counter $cnt_{swb}$ is decreased for example by "1" (see 110);
- If "$E_{fb,max}>0.6\cdot\bar{E}_{swb}$", "$E_{swb,max}>0.72\cdot\bar{E}_{wb}$" and "$E_{wb,max}>0.6\cdot\bar{E}_{nb}$" (see 111) and "$3\cdot E_{fb,max}>E_{swb,max}$" (see 112), a counter $cnt_{fb}$ is increased for example by "1" (see 113); and
- If the condition "$E_{fb,max}>0.6\cdot\bar{E}_{swb}$", "$E_{swb,max}>0.72\cdot\bar{E}_{wb}$" and "$E_{wb,max}>0.6\cdot\bar{E}_{nb}$" (see 111) is not met, and "$4.1\cdot E_{fb}<E_{swb}$" (see 114), the counter $cnt_{fb}$ is decreased for example by "1" (see 115).

2.3.4 Final Audio Band-Width Decision

In FIG. 1, if the BWD analyser 356 performs the tests in sequential order, it could happen that the decision about the audio band-width is changed several times using this logic. After every selection of a particular audio band-width, certain counters are reset to their minimal value for example of "0" or to their maximum value for example of "100". The audio band-width counters are constrained between 0 and 100 and the values of the counters are compared against certain thresholds to decide a BW change. These thresholds are selected such that BW change (switching between audio band-widths) happens with a certain hysteresis in order to avoid frequent changes in switching between the detected and subsequently the coded audio band-width. The hysteresis is shorter (for example 10 frames in EVS) if a potential switching from a lower BW to a higher BW is tested. This short hysteresis avoids any potential quality degradation due to a loss of a HF content as the change of a HF content is usually abrupt and subjectively noticeable. On the other hand, a longer (for example 90 frames in EVS) hysteresis is applied if a potential switching from a higher BW to a lower BW is tested. In this case, there is practically no important HF content in the spectrum, so the change of the spectrum content is not unnaturally abrupt and annoying.

Figure 2:
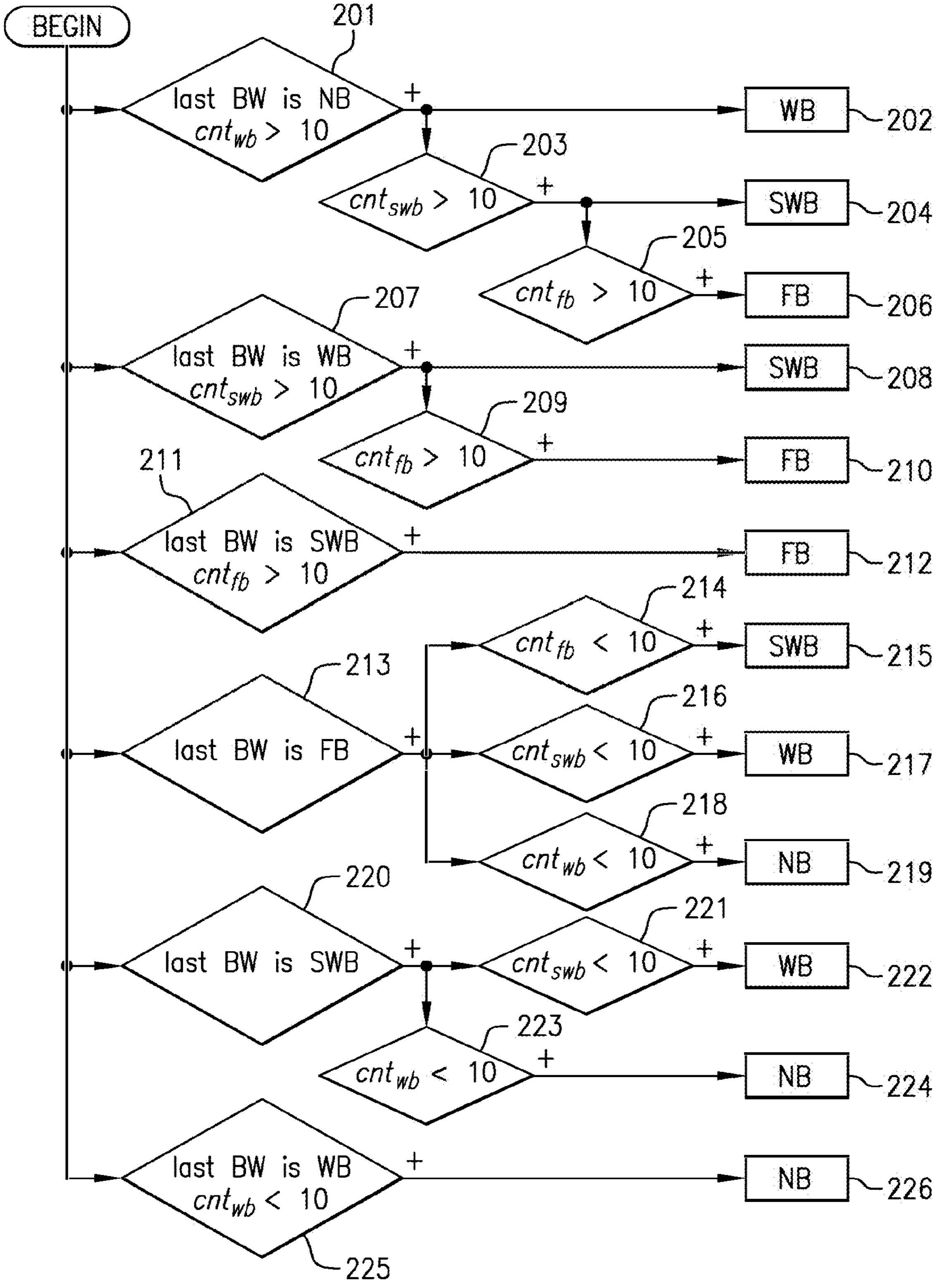
FIG. 2 is a schematic flow chart showing a logic of final audio band-width decision for switching between audio band-widths upon coding of an input sound signal.

FIG. 2 is a schematic flow chart showing a decision logic for the audio band-width detection. The output of the logic of FIG. 2 is the final audio band-width decision. Referring to FIG. 2, the final audio band-width decision module 357 performs the operation of final BWD decision 307 as follows:

- If the last audio band-width BW (last audio band-width refers to the audio band-width decided in the previous frame) is NB (narrow-band) and the counter $cnt_{wb}>10$ (see 201), then the final audio band-width decision by module 357 is WB (wide-band) (see 202);
- If the last audio band-width BW is NB (narrow-band) and the counter $cnt_{wb}>10$ (see 201), and the counter $cnt_{swb}>10$ (see 203), then the final audio band-width decision by module 357 is SWB (super-wide-band) (see 204);
- If the last audio band-width BW is NB (narrow-band) and the counter $cnt_{wb}>10$ (see 201), the counter $cnt_{swb}>10$ (see 203), and the counter $cnt_{fb}$>10 (see 205), then the final audio band-width decision by module 357 is FB (full-band) (see 206);

If the last audio band-width BW is WB (wide-band) and the counter $cnt_{swb}$>10 (see 207), then the final audio band-width decision by module 357 is SWB (super-wide-band) (see 208);

If the last audio band-width BW is WB (wide-band) and the counter $cnt_{swb}$>10 (see 207), and the counter $cnt_{fb}$>10 (see 209), then the final audio band-width decision by module 357 is FB (full-band) (see 210);

If the last audio band-width BW is SWB (super-wide-band) and the counter $cnt_{fb}$>10 (see 211), then the final audio band-width decision by module 357 is FB (full-band) (see 212);

If the last audio band-width BW is FB (full-band) (see 213) and if:

- the counter $cnt_{fb}$<10 (see 214), then the final audio band-width decision by module 357 is SWB (super-wide-band) (see 215);
- the counter $cnt_{swb}$<10 (see 216), then the final audio band-width decision by module 357 is WB (wide-band) (see 217);
- the counter $cnt_{wb}$<10 (see 218), then the final audio band-width decision by module 357 is NB (narrow-band) (see 219);

If the last audio band-width BW is SWB (super-wide-band) (see 220) and if:

- the counter $cnt_{swb}$<10 (see 221), then the final audio band-width decision by module 357 is WB (wide-band) (see 222);
- the counter $cnt_{wb}$<10 (see 223), then the final audio band-width decision by module 357 is NB (narrow-band) (see 224);

If the last audio band-width BW is WB (wide-band) and the counter $cnt_{wb}$<10 (see 225), then the final audio band-width decision by module 357 is NB (narrow-band) (see 226).

The final audio band-width decision from FIG. 2 is used to select an appropriate sound signal coding mode.

2.3.5 Newly Added Code

In the source code, the newly added code (marked by "###" sequence) may be as follows—the following excerpt is from function ivas_mdct_core_whitening_enc( ) of the IVAS sound codec:

```
    for ( ch = 0; ch < CPE_CHANNELS; ch++ )
    {
        SetCurrentPsychParams( ... );
        tcx_ltp_encode( ... );
        core_signal_analysis_high_bitrate( ... );
###     if ( sts[ch]->hTcxEnc->transform_type[0] == TCX_20&&
###         sts[ch]->hTcxCfg->tcx_last_overlap_mode !=
            TRANSITION_OVERLAP
)
###     {
###         if ( sts[ch]->mct_chan_mode !=
            MCT_CHAN_MODE_LFE )
###         {
###             bw_detect( ... );
###         }
###     }
    }
```

Computation related to the BWD analysis operation 306 at the beginning of TCX core encoding (see 358) in a current frame has as a consequence that the final BWD decision operation 307 is postponed to the front pre-processing (see 303) of the next frame. Thus, the former EVS BWD algorithm is split into two parts (see 306 and 307); the BWD analysis operation 306 (i.e. computing energy values per frequency band and updating long-term counters) is done at the beginning of current TCX core coding and the final BWD decision operation 307 is done only in the next frame before the TCX core encoding starts.

FIG. 3 shows the above discussed differences between the BWD related elements in the EVS codec (FIG. 3*a*)) and the IVAS codec (FIG. 3*b*)).

2.3.6 BWD Information in CPE

In MDCT stereo coding, the final BWD decision from the decision module 357 about the input and thus coded audio band-width is done not separately for each of the two channels but as a joint decision for both channels. In other words, in MDCT stereo coding, both channels are always coded using the same audio band-width and the information about the coded audio band-width is transmitted only once per one Channel Pair Element (CPE) (CPE is a coding technique that encodes two channels by means of a stereo coding technique). If the final BWD decision is different between the two CPE channels, both CPE channels are coded using the broader audio band-width BW of the two channels. E.g. in case that the detected audio band-width BW is the WB band-width for the first channel and the SWB band-width for the second channel, the coded audio band-width BW of the first channel is rewritten to SWB band-width and the SWB band-width information is transmitted in the bit-stream. The only exception is a case when one of the MDCT stereo channels corresponds to the LFE channel, then the coded audio band-width of the other channel is set to the audio band-width of this channel. This is applied mostly in MC format mode when multiple MC channels are coded using several MDCT stereo CPEs.

Figure 4:
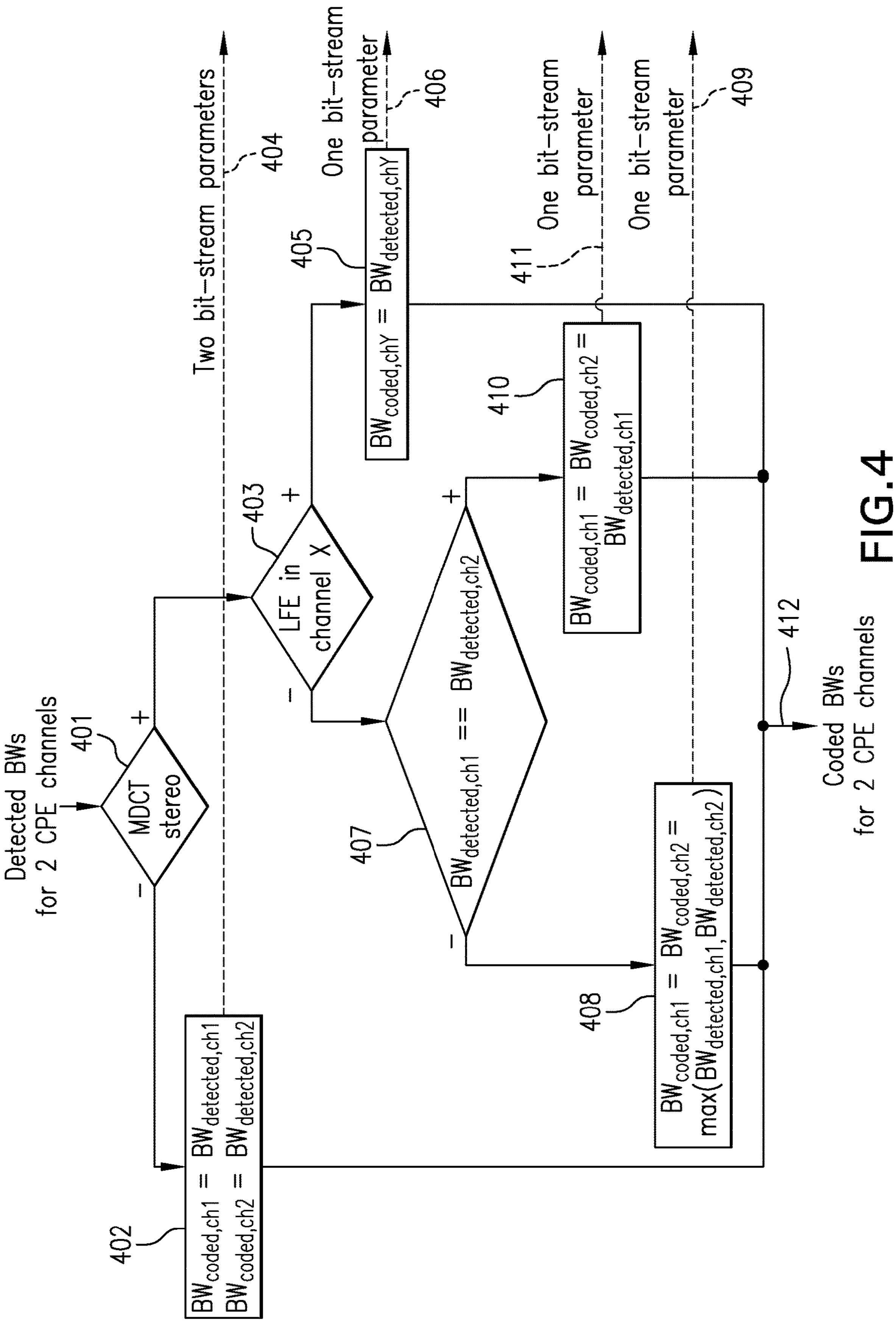
FIG. 4 is a schematic flow chart showing a logic for coding audio band-width information as a joint parameter for two MDCT stereo channels.

The final audio band-width decision module 357 may use the logic of FIG. 4 for coding the audio band-width information (detected audio band-widths of the channels) as a joint parameter for two MDCT stereo channels.

Referring to FIG. 4, if audio band-widths for two CPE channels are detected:

- if MDCT stereo is not used (see 401):
  - the audio band-width $BW_{coded,ch1}$ for coding a first channel is the audio band-width $BW_{detected,ch1}$ detected by the final audio band-width decision module 357, the audio band-width $BW_{coded,ch2}$ for coding a second channel is the audio band-width $BW_{detected,ch2}$ detected by the final audio band-width decision module 357 (see 402), and the audio band-width information comprises two bit-stream parameters (see 404);
- if MDCT stereo is used (see 401):
  - if the channel X is a LFE channel (see 403), the audio band-width $BW_{coded,chY}$ for coding the other channel Y is the audio band-width $BW_{detected,chY}$ detected by the final audio band-width decision module 357, and the audio band-width information is a one bit-stream parameter (see 406);
  - if the channel X is not a LFE channel (see 403):
    - if the audio band-width $BW_{detected,ch1}$ detected by the final audio band-width decision module 357 for coding a first channel is not equal to the audio band-width $BW_{detected,ch2}$ detected by the final audio band-width decision module 357 for coding a second channel (see 407), the audio band-width $BW_{coded,ch1}$ for coding the first channel is equal to the audio band-width $BW_{coded,ch2}$ for coding the second channel and is equal to the maximum of $BW_{detected,ch1}$ and $BW_{detected,ch2}$ (see 408) and the audio band-width information is a one bit-stream parameter (see 409); and if the audio band-width $BW_{detected,ch1}$ detected by the final audio band-width decision module 357 for coding the first channel is equal to the audio band-width $BW_{detected,ch2}$ detected by the final audio band-width decision module 357 for coding the second channel (see 407), the audio band-width $BW_{coded,ch1}$ for coding the first channel is equal to the audio band-width $BW_{coded,ch2}$ for coding the second channel and is equal to $BW_{detected,ch1}$ (see 410) and the audio band-width information is a one bit-stream parameter (see 411).

The audio band-width information 412 from blocks 405, 408 and 410 is coded by the MDCT core encoder 358 (FIG. 3*b*)) as a joint parameter for the two CPE channels.

In the source code of the IVAS sound codec, the final BW decision logic may look like as follows, where the newly added code is marked by the "###" sequence:

```
###     void set_bw_stereo(
###       CPE_ENC_HANDLE hCPE, /* i/o: CPE encoder
          structures   */
###     )
###     {
###       Encoder State ** st = hCPE->hCoreCoder;
###
###      if ( hCPE->element_mode == IVAS_CPE_MDCT )
###       {
###         /* do not check band-width in LFE channel */
###         if ( sts[0]->mct_chan_mode ==
            MCT_CHAN_MODE_LFE)
###         {
###           st[0]->bwidth = st[0]->input_bwidth;
###         }
###         else if ( sts[1]->mct_chan_mode ==
            MCT_CHAN_MODE_LFE)
###         {
###           st[1]->bwidth = st[1]->input_bwidth;
###         }
###         /* ensure that both CPE channels have the same audio
            band-width */
###         else if ( st[0]->input_bwidth == st[1]->input_bwidth )
###         {
###           st[0]->bwidth = st[0]->input_bwidth;
###           st[1]->bwidth = st[0]->input_bwidth;
###         }
###         else if( st[0]->input_bwidth != st[1]->input_bwidth )
###         {
###           st[0]->bwidth = max( st[0]->input_bwidth,
              st[1]->input_bwidth );
###           st[1]->bwidth = max( st[0]->input_bwidth,
              st[1]->input_bwidth );
###         }
###       }
###
###       st[0]->bwidth = max( st[0]->bwidth, WB );
###       st[1]->bwidth = max( st[1]->bwidth, WB );
###
###       return;
###     }
```

The above function is run at the Core Codec configuration block, i.e. at the end of the front pre-processing, and before TCX core coding starts.

It is noted that the same principle of joint audio band-width information coding can be used in other stereo coding techniques which codes two channels using two core encoders such as in TD stereo.

3. Band-Width Switching (BWS)

3.1 Background

In the EVS codec, a change of the audio band-width BW may happen as a consequence of a bitrate change or a coded audio band-width change. When a change from wide-band (WB) to super-wide-band (SWB) occurs, or from SWB to WB, an audio band-width switching post-processing at the decoder is performed in order to improve the perceptual quality for end users. A smoothing is applied for switching from WB to SWB, and a blind audio band-width extension is employed for switching from SWB to WB. A summary of the EVS BWS algorithm is given in the following paragraph while more information can be found in Section 6.3.7 of Reference [1].

First, in EVS, an audio band-width switching detector receives transmitted BW information and detects, in response to such BW information, if there is an audio band-width switching or not (Section 6.3.7.1 of Reference [1]) and accordingly updates few counters. Then, in case of switching from SWB to WB, the High-Band (HB) part of the spectrum (HB>8 kHz) is estimated in next frames based on the last-frame SWB Band-Width Extension (BWE) technology. The HB spectrum is faded out in 40 frames while a time-domain signal at an output sampling rate is used to perform an estimation of SWB BWE parameters. On the other hand, in case of switching from WB to SWB, the HB part of the spectrum is faded in 20 frames.

3.2 Issues

In IVAS, the BWS technique as used in EVS can be implemented in the decoder, but it is never applied due to bitrate limitations in the EVS native BWS algorithm. Moreover, the EVS native BWS algorithm does not support a BWS in the TCX core. Finally, the EVS native BWS algorithm cannot be applied in DFT stereo CNG (Comfort Noise Generation) frames because the time-domain signal is not available to perform the algorithm estimation thereon.

3.3 BWS in IVAS

In the IVAS sound codec, a new and different BWS algorithm is thus implemented.

First, such BWS algorithm is implemented at the encoder part of the IVAS sound codec. This choice has an advantage of a very low complexity foot-print of the IVAS BWS algorithm compared to the EVS native one.

Another design choice is that the BWS algorithm in IVAS is implemented only for switching from a lower BW to a higher BW (for example from WB to SWB). In this direction, the switching is relatively fast (see above Section 2.3.4) and the resulting, abrupt HF content change can be annoying. The new and different BWS algorithm is thus designed to smooth such switching. On the other hand, no special treatment is implemented for switching from a higher BW to a lower BW because in this direction there is practically no important HF content in the spectrum, so the change of the spectrum content is not unnaturally abrupt and annoying.

3.4 Proposed BWS

Figure 5:
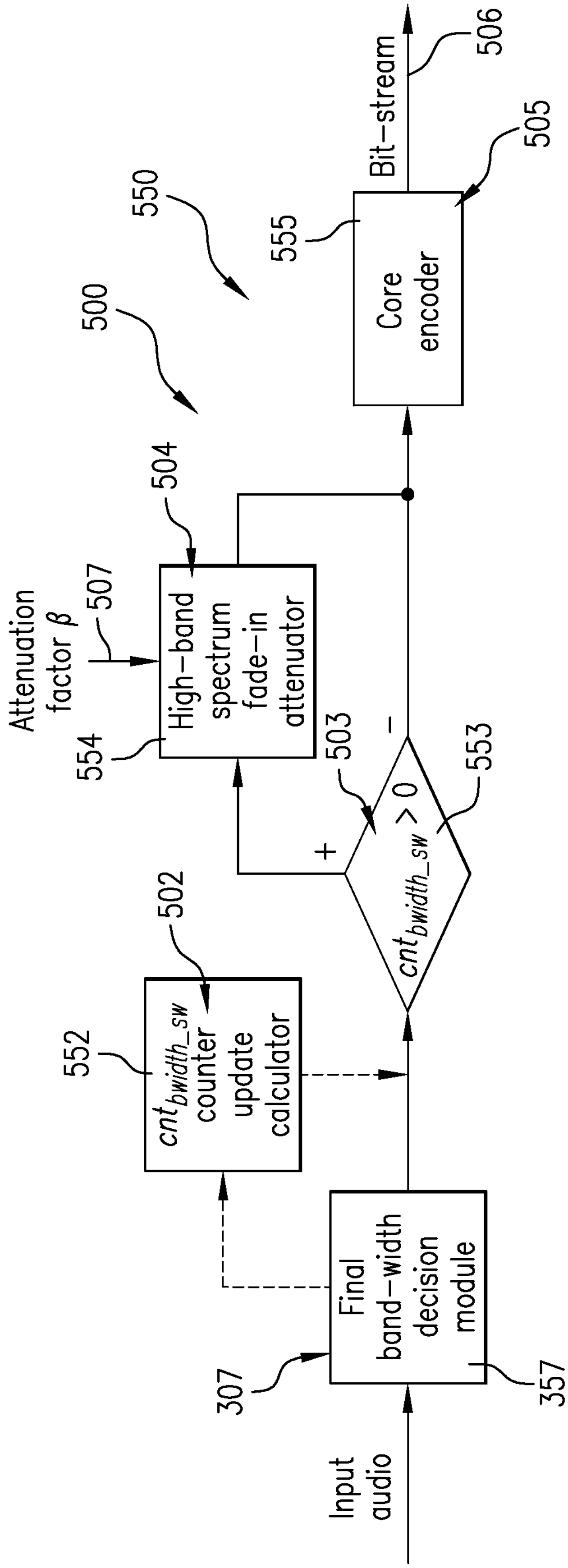
FIG. 5 is a schematic block diagram showing concurrently the method and device for audio band-width switching according to the present disclosure.

FIG. 5 is a schematic block diagram showing concurrently the method 500 and device 550 for audio band-width switching according to the present disclosure. As illustrated in FIG. 5, the method for audio band-width switching comprises the final audio band-width decision operation 307, a $cnt_{bandwidth\_sw}$ counter updating operation 502, a comparison operation 503, a high-band spectrum fade-in operation 504. As also illustrated in FIG. 5, the device for audio band-width switching comprises the final audio band-width decision module 357 for performing the final BWD decision operation 307, a calculator 552 for performing the $cnt_{bandwidth\_sw}$ counter updating operation 502, a comparator 553 for performing the comparison operation 503, and an attenuator 554 for performing the high-band spectrum fade-in operation 504.

The proposed BWS algorithm used by the method 500 and device 550 of FIG. 5 smooths the perceptual impact of audio band-width switching already at the encoder part of the IVAS sound codec while removing the artifacts in the synthesis. The high-band (HB>8 kHz) part of the spectrum is attenuated in several consecutive frames after a BWS instance as indicated by the final audio band-width decision module 357. More specifically, a gain of the HB spectrum is faded-in in attenuator 554 and thus smartly controlled in case of a BWS in order to avoid unpleasant artifacts. The attenuation is applied before the HB spectrum is quantized and encoded in the core encoder 555 and corresponding core encoding operation 505, so the smoothed BW transitions are already present in the transmitted bit-stream 506 and no further treatment is needed at the decoder. For example, in case of audio band-width switching from WB to SWB, the HB spectrum corresponding to frequencies above 8 kHz is smoothed before further processing. In other words, audio band-width switching is inherent in the coded sound signal, no extra bits related to audio band-width switching are transmitted to a decoder, and no additional treatment is made by the decoder in relation to audio band-width switching.

3.4.1 BWS Technique

The BWS mechanism of the method and device for audio band-width switching of FIG. 5 works as follows.

First, the calculator 552 updates a counter of frames $cnt_{bandwidth\_sw}$ where audio band-width switching occurs and attenuation is applied at the end of the pre-processing for each IVAS transport channel based on the final BWD decision 307 as follows.

The calculator 552 initially set the value of the counter of frames $Cnt_{bwidth\_sw}$ to an initialization value of "0". When there is detected—as a response to a final BWD decision from the final audio band-width decision module 357—a BW change from a lower audio band-width to a higher audio band-width, typically from WB to SWB or FB, the value of the counter of frames is increased by 1. In the following frames, the counter is increased by 1 in every frame until it reaches its maximum value $B_{tran}$ as defined herein after. When the counter reaches its maximum value $B_{tran}$, the counter is then reset to 0 and a new detection of a BW switching can occur.

In the source code, the newly added code (marked by a "###" sequence) may be as follows. The code excerpt is found at the end of function core_switching_pre_enc( ) of the IVAS sound codec:

```
###    /*--------------------------------------------------------------------*
###     * band-width switching from WB -> SWB/FB
###     *--------------------------------------------------------------------*/
###
###    if( st->bwidth sw cnt == 0 )
###    {
###        if( st->bwidth >= SWB && st->last_bwidth == WB )
###        {
###            st->bwidth_sw_cnt++;
###        }
###    }
###    else
###    {
###        st->bwidth_sw_cnt++;
###
###        if ( st->bwidth_sw_cnt == BWS_TRAN_PERIOD )
###        {
###            st->bwidth_sw_cnt =0;
###        }
###    }
```

Next, when counter $cnt_{bwidth\_sw}$, updated or not by the calculator 552, is larger than 0 as determined by the comparator 553, the attenuator 554 applies to the sound signal in frame i an attenuation factor βi (507) defined for example as follows:

$$\beta_i = \frac{cnt_{bwidth\_sw}}{B_{tran}},\ i = 0, \ldots, B_{tran} - 1$$

where $cnt_{bandwidth\_sw}$ is the above mentioned audio band-width switching frame counter (bwidth_sw_cnt in the source code above) and $B_{tran}$ (macro BWS_TRAN_PERIOD in the source code above) is a BWS transition period which corresponds to a number of frames where the attenuation is applied after BW switching from a lower BW to a higher BW. The constant $B_{tran}$ was found experimentally and was set to 5 in the IVAS framework.

Figure 6:
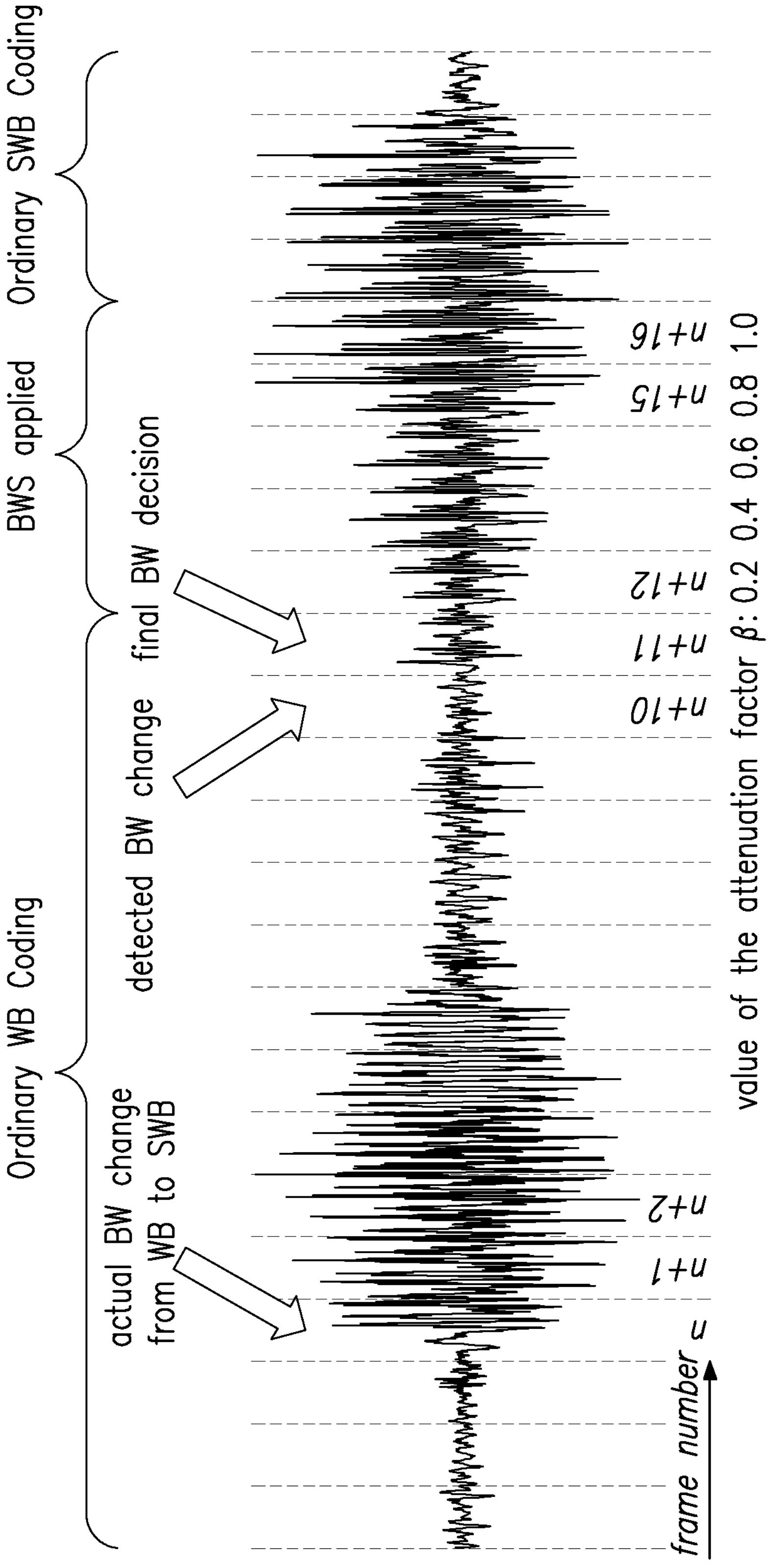
FIG. 6 is a graph showing actual values of an attenuation factor in frames after audio band-width switching in IVAS running in the MDCT stereo mode.

FIG. 6 is a graph showing actual values of the attenuation factor β in frames after the BWD has detected a BW change in IVAS running in the MDCT stereo mode. The non-limitative example of FIG. 6 supposes that the BW change is detected in the fastest possible time (i.e. a hysteresis of 10 frames), the final BWD decision is made in the following frame (n+11), and the BWS is applied in the next $B_{tran}=5$ frames (frames n+12 to n+16). Finally, the attenuation factor β is applied in $B_{tran}$ frames depending on the coding mode as follows.

In TCX and HQ core frames (HQ stands for High Quality MDCT coder in EVS, see Section 5.3.4 of Reference [1]), the high-band gain of the spectrum $X_M(k)$ of length L as defined in Section 5.3.2 of Reference [1] is controlled and the high-band (HB) part of the spectrum $X_M(k)$, right after the time-to-frequency domain transformation, is updated (faded-in) by the attenuator 554 using, for example, the following relation:

$$X'_M(k+L_{WB})=\beta_i * X_M(k+L_{WB}), i=0, \ldots, B_{tran}-1,$$

where $L_{WB}$ is the length of spectrum corresponding to the WB audio band-width, i.e. $L_{WB}=320$ samples in the example of IVAS with a frame length of 20 ms (normal HQ, or TCX20 frame), $L_{WB}=80$ samples in transient frames, $L_{WB}=160$ samples in TCX10 frames, and k is the sample index in the range $[0, K-L_{WB}-1]$ where K is the length of the whole spectrum in particular transform sub-mode (normal, transient, TCX20, TCX10).

In ACELP core with time-domain BWE (TBE) frames, the attenuator 554 applies the attenuation factor $\beta_i$ to the SWB gain shapes parameters of the HB part of the spectrum before these parameters are additionally processed. The temporal gain shapes parameters gs(j) are defined in Section 5.2.6.1.14.2 of Reference [1] and consist of four values. Thus, in an example of implementation:

$$gs'(j)=\beta_i * gs(j), i=0, \ldots, B_{tran}-1,$$

where j=0, . . . , 3 is the gain shape number.

In ACELP core with frequency-domain BWE (FD-BWE) frames, the high-band gain of the transformed original input signal $X_M(k)$ of length L as defined in Section 5.2.6.2.1 of Reference [1] is controlled and the HB part of the MDCT spectrum is updated by the attenuator 554 using, for example, the following relation:

$$X'_M(k+L_{WB})=\beta_i * X_M(k+L_{WB}), i=0, \ldots, B_{tran}-1$$

Note that NB coding is not considered in IVAS and SWB to FB switching is not treated as its subjective and objective impact is negligible. However, the same principles as above can be used to cover all BWS scenarios.

The attenuated sound signal from the attenuator 554 is then encoded in the core encoder 555. If the counter $cnt_{bwidth\_sw}$, updated or not by the calculator 552, is not larger than 0 as determined by the comparator 553, then the sound signal is encoded in the core encoder 555 without attenuation.

3.4.2 BWS Impact Example

Figure 7:
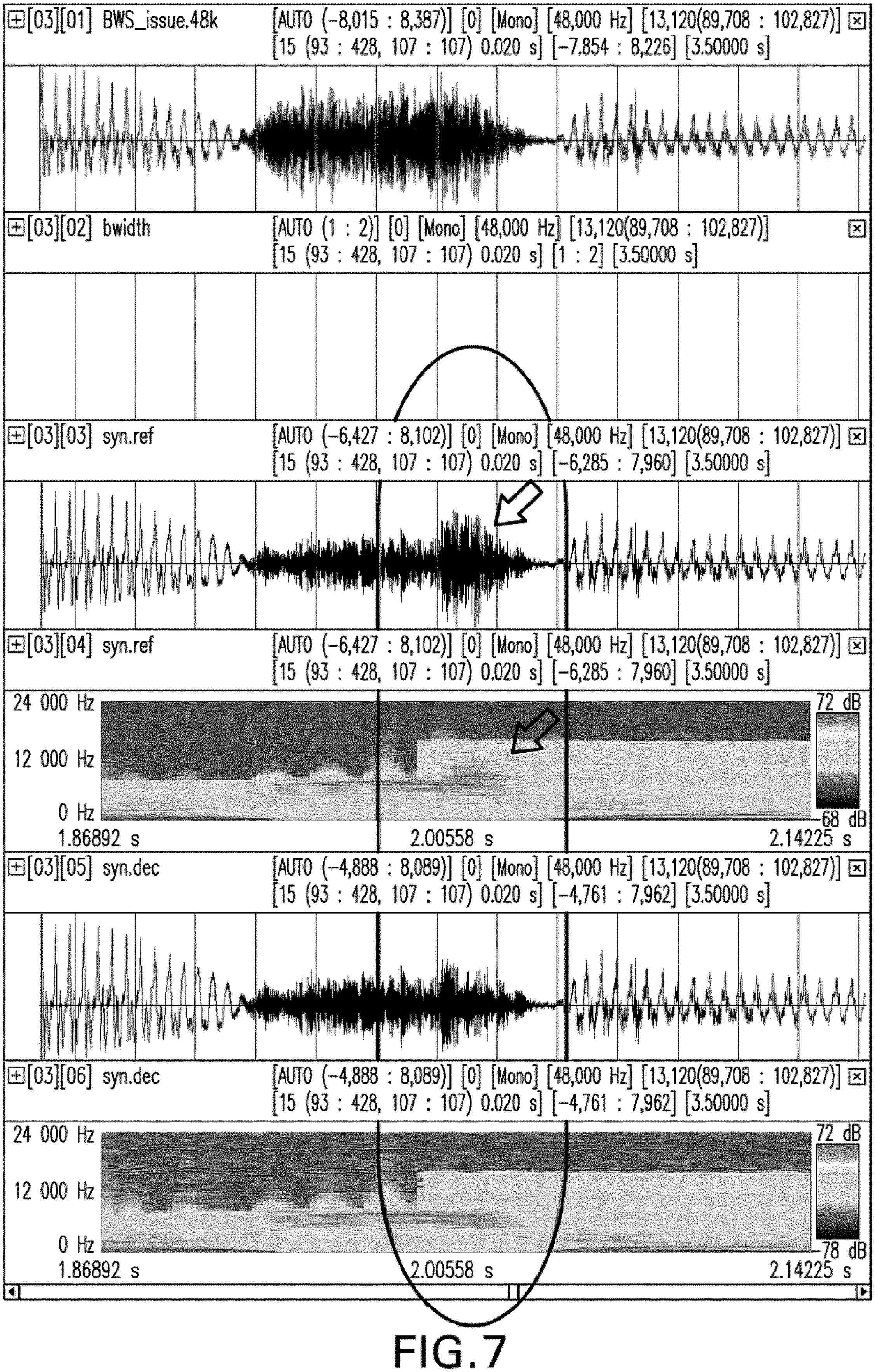
FIG. 7 is an example of waveforms showing the impact of an audio band-width switching mechanism on a decoded quality, in a segment of speech signal where an audio band-width change from wide-band to super-wide-band happens in the highlighted part.

FIG. 7 is an example of waveforms showing the impact of the BWS mechanism on the decoded quality. Specifically, FIG. 7 shows a segment of speech signal (0.3 second long in the example) where a BW change from WB to SWB happens in the highlighted part. FIG. 7 shows from the top to bottom: (1) an input signal waveform, (2) a BW parameter (value 1 corresponds to WB while value 2 to SWB), (3) a decoded synthesis waveform when BWS is not applied, (4) a decoded synthesis spectrum when BWS is not applied, (5) a decoded synthesis waveform when BWS is applied, and (6) a decoded synthesis spectrum when BWS is applied. Also highlighted by arrows in FIG. 7, it can be observed that the decoded synthesis when BWS is applied does not suffer from an abrupt energy increase in time domain, resp. in HFs in frequency domain. Consequently, an artifact (an annoying click) is removed from the synthesis when the herein disclosed BWS technique is used.

4. Hardware Implementation

Figure 8:
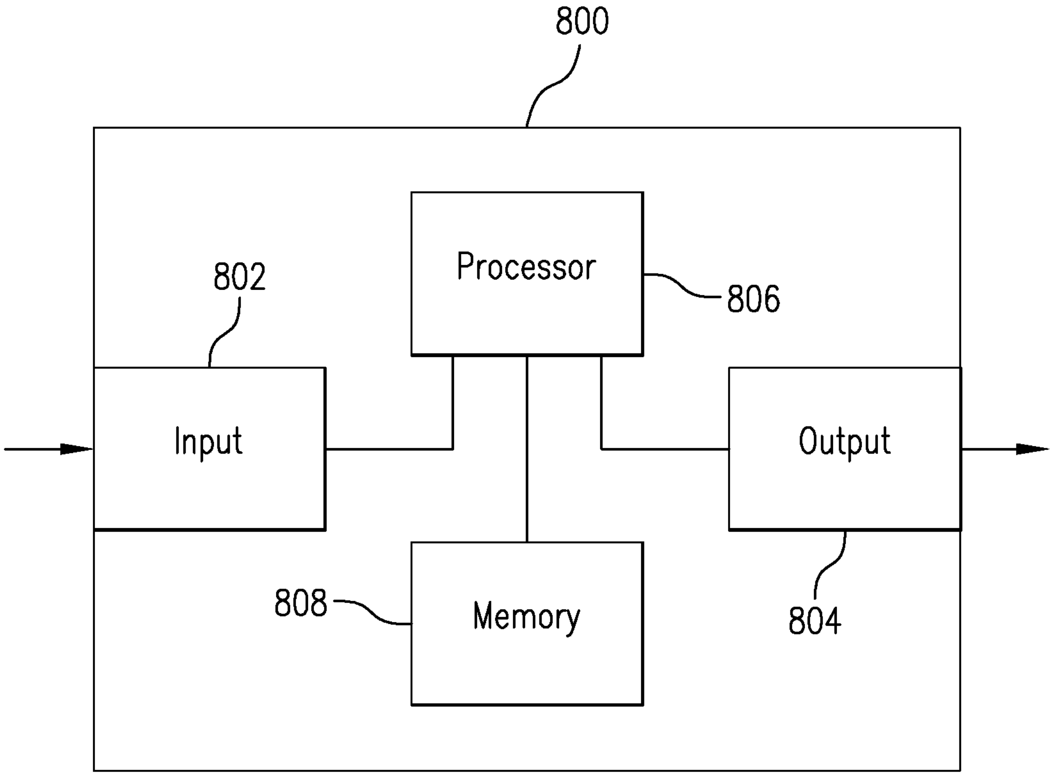
FIG. 8 is a simplified block diagram of an example configuration of hardware components implementing the method and device for audio band-width detection and the method and device for audio band-width switching.

FIG. 8 is a simplified block diagram of an example configuration of hardware components forming the above described encoder part of an IVAS sound codec 305 using the audio band-width detection method and device and the audio band-width switching method and device.

The encoder part of an IVAS sound codec 305 using the audio band-width detection method and device and the audio band-width switching method and device may be implemented as a part of a mobile terminal, as a part of a portable media player, or in any similar device. The encoder part of an IVAS sound codec 305 using the audio band-width detection method and device and the audio band-width switching method and device (identified as 800 in FIG. 8) comprises an input 802, an output 804, a processor 806 and a memory 808.

The input 802 is configured to receive the input sound signal 320 of FIG. 3*b*), in digital or analog form. The output 804 is configured to supply the output, coded sound signal. The input 802 and the output 804 may be implemented in a common module, for example a serial input/output device.

The processor 806 is operatively connected to the input 802, to the output 804, and to the memory 808. The processor 806 is realized as one or more processors for executing code instructions in support of the functions of the various components of the encoder part of an IVAS sound codec 305 using the audio band-width detection method and device and the audio band-width switching method and device as illustrated in FIG. 3*b*).

The memory 808 may comprise a non-transient memory for storing code instructions executable by the processor(s) 806, specifically, a processor-readable memory comprising/storing non-transitory instructions that, when executed, cause a processor(s) to implement the operations and components of the above described encoder part of an IVAS sound codec 305 using the audio band-width detection method and device and the audio band-width switching method and device as described in the present disclosure. The memory 808 may also comprise a random access memory or buffer(s) to store intermediate processing data from the various functions performed by the processor(s) 806.

Those of ordinary skill in the art will realize that the description of the encoder part of an IVAS sound codec 305 using the audio band-width detection method and device and the audio band-width switching method and device is illustrative only and is not intended to be in any way limiting. Other embodiments will readily suggest themselves to such persons with ordinary skill in the art having the benefit of the present disclosure. Furthermore, the disclosed encoder part of an IVAS sound codec 305 using the audio band-width detection method and device and the audio band-width switching method and device may be customized to offer valuable solutions to existing needs and problems of encoding and decoding sound.

In the interest of clarity, not all of the routine features of the implementations of the encoder part of an IVAS sound codec 305 using the audio band-width detection method and device and the audio band-width switching method and device are shown and described. It will, of course, be appreciated that in the development of any such actual implementation of the encoder part of an IVAS sound codec 305 using the audio band-width detection method and device and the audio band-width switching method and device, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the components/processors/modules, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

The encoder part of an IVAS sound codec 305 using the audio band-width detection method and device and the audio band-width switching method and device as described herein may use software, firmware, hardware, or any combination(s) of software, firmware, or hardware suitable for the purposes described herein.

In the encoder part of an IVAS sound codec 305 using the audio band-width detection method and device and the audio band-width switching method and device as described herein, the various operations and sub-operations may be performed in various orders and some of the operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure

5. REFERENCES

The present disclosure mentions the following references, of which the full content is incorporated herein by reference:

[1] 3GPP TS 26.445, v.16.1.0, "Codec for Enhanced Voice Services (EVS); Detailed Algorithmic Description", July 2020.

[2] V. Eksler, M. Jelinek, and W. Jaegers, "Audio Bandwidth Detection in the EVS Codec," in Proc. *IEEE Global Conf. on Signal and Information Processing* (GlobalSIP), Orlando, FL, USA, 2015.

[3] F. Baumgarte, C. Faller, "Binaural cue coding—Part I: Psychoacoustic fundamentals and design principles," IEEE Trans. Speech Audio Processing, vol. 11, pp. 509-519, Nov. 2003.

[4] T. Vaillancourt, "Method and system using a long-term correlation difference between left and right channels for time domain down mixing a stereo sound signal into primary and secondary channels," PCT Application WO2017/049397A1.

[5] 3GPP SA4 contribution S4-170749, "New WID on EVS Codec Extension for Immersive Voice and Audio Services", SA4 meeting #94, Jun. 26-30, 2017, http://www.3gpp.org/ftp/tsg sa/WG4 CODEC/TSGS4 94/Docs/54-170749.zip

[6] V. Pulkki, C. Faller, "Directional audio coding: Filterbank and STFT-based design," in 120$^{th}$ *AES Convention*, Paper 6658, Paris, May 2006.

[7] M. Neuendorf et al., "MPEG Unified Speech and Audio Coding—The ISO/MPEG Standard for High-Efficiency Audio Coding of all Content Types", Journal of the Audio Engineering Society, vol. 61 n° 12, pp. 956-977, December 2013.

[8] J. Herre et al., "MPEG-H Audio—The New Standard for Universal Spatial/3D Audio Coding", in 137th International AES Convention, Paper 9095, Los Angeles, Oct. 9-12, 2014.

[9] 3GPP SA4 contribution S4-180462, "On spatial metadata for IVAS spatial audio input format", SA4 meeting #98, Apr. 9-13, 2018, https://www.3gpp.org/ftp/tsg sa/WG4 CODEC/TSGS4 98/Docs/54-180462.zip

What is claimed is:

1. A device for detecting, in an encoder part of a sound codec including a sound signal front pre-processing stage followed by a sound signal MDCT (Modified Discrete Cosine Transform) core encoding stage, an audio band-width of a sound signal to be coded, comprising:

at least one processor; and a memory coupled to the processor and storing non-transitory instructions that when executed cause the processor to implement:

an analyser of the sound signal, integrated to the MIDCT core encoding stage, for analysing a MDCT spectrum of the sound signal; and a final audio band-width decision module integrated to the front pre-processing stage for delivering a final decision about the detected audio band-width using the result of the analysis of the MIDCT spectrum of the sound signal;

wherein, in the encoder part of the sound codec, the final audio band-width decision module integrated to the front pre-processing stage is located upstream of the sound signal analyser integrated to the MDCT core encoding stage and wherein, in operation, the result of the analysis of the MIDCT spectrum of the sound signal by the sound signal analyser in a current frame is used by the final audio band-width decision module in a next frame following the current frame to deliver the final decision about the detected audio band-width of the sound signal.

2. The audio band-width detecting device according to claim 1, wherein the sound signal analyser calculates mean values of an energy of the MDCT spectrum of the sound signal in a number of spectral regions.

3. The audio band-width detecting device according to claim 1, wherein the sound signal analyser calculates maximum values of an energy of the MDCT spectrum of the sound signal in a number of spectral regions.

4. The audio band-width detecting device according to claim 1, wherein the sound signal analyser calculates mean and maximum values of an energy of the MDCT spectrum of the sound signal in a number of spectral regions.

5. The audio band-width detecting device according to claim 4, wherein the sound signal analyser calculates the energy of the MDCT spectrum of the sound signal in a plurality of frequency bands, wherein the spectral regions are each defined by at least one of the frequency bands, and wherein the sound signal analyser uses the calculated energy of the MDCT spectrum of the sound signal in the frequency bands to calculate the mean and maximum values of the energy of the MDCT spectrum.

6. The audio band-width detecting device according to claim 4, wherein the sound signal analyser calculates long-term values of the mean energy values of the MDCT spectrum of the sound signal in regions amongst the number of spectral regions.

7. The audio band-width detecting device according to claim 6, wherein the sound signal analyser increases or decreases counters related to the respective spectral regions in response to the long-term values of the mean energy values of the MDCT spectrum of the sound signal and the maximum values of the energy of the MIDCT spectrum of the sound signal.

8. The audio band-width detecting device according to claim 7, wherein the final audio band-width decision module uses a decision logic for switching between audio band-widths, in response to comparison between the counters and given thresholds.

9. The audio band-width detecting device according to claim 8, wherein the decision logic of the final audio band-width decision module is also responsive to a previously decided audio band-width.

10. The audio band-width detecting device according to claim 8, wherein the final audio band-width decision module uses a hysteresis to avoid frequent switching between audio band-widths.

11. The audio band-width detecting device according to claim 10, wherein the hysteresis used by the final audio band-width decision module is shorter in case of a potential switching from a lower audio band-width to a higher audio band-width, and longer in case of a potential switching from a higher audio band-width to a lower audio band-width.

12. The audio band-width detecting device according to claim 4, wherein the sound signal analyser updates counters related to the spectral regions.

13. The audio band-width detecting device according to claim 1, wherein the sound signal analyser performs sound signal analysis in frames of a given duration and skips sound signal analysis in frames longer and shorter than said given duration.

14. The audio band-width detecting device according to claim 1, wherein the sound signal is a multi-channel signal including a plurality of channels, and wherein the final audio band-width decision module codes the detected audio band-widths of the channels as a joint parameter.

15. The audio band-width detecting device according to claim 1, wherein, in a MDCT stereo mode, the sound signal analyser analyses the MDCT spectrum of the sound signal in the MDCT core encoding stage of the encoder part of the sound codec instead of calculating in the sound signal front pre-processing stage of the encoder part of the sound codec CLDFB (Complex Low Delay Filter Bank) values not needed in the MDCT stereo mode.

16. A method for detecting, in an encoder part of a sound codec including a sound signal front pre-processing stage followed by a sound signal MDCT (Modified Discrete Cosine Transform) core encoding stage, an audio band-width of a sound signal to be coded, comprising:

in the MDCT core encoding stage, analysing a MDCT spectrum of the sound signal; and in the front pre-processing stage, finally deciding about the detected audio band-width using the result of the analysis of the MIDCT spectrum of the sound signal;

wherein, in the encoder part of the sound codec, finally deciding in the front pre-processing stage about the detected audio band-width of the sound signal is made upstream of the analysis of the MDCT spectrum of the sound signal in the MDCT core encoding stage and wherein, in operation, the result of the analysis of the MDCT spectrum of the sound signal in a current frame in the MIDCT core encoding stage is used in a next frame following the current frame in the front pre-processing stage to finally decide about the detected audio band-width of the sound signal.

17. The audio band-width detecting method according to claim 16, wherein the analysis of the MIDCT spectrum of the sound signal comprises calculating mean values of an energy of the MDCT spectrum of the sound signal in a number of spectral regions.

18. The audio band-width detecting method according to claim 16, wherein the analysis of the MDCT spectrum of the sound signal comprises calculating maximum values of an energy of the MDCT spectrum of the sound signal in a number of spectral regions.

19. The audio band-width detecting method according to claim 16, wherein the analysis of the MIDCT spectrum of the sound signal comprises calculating mean and maximum values of an energy of the MDCT spectrum of the sound signal in a number of spectral regions.

20. The audio band-width detecting method according to claim 19, wherein the analysis of the MDCT spectrum of the sound signal comprises calculating the energy of the MDCT spectrum of the sound signal in a plurality of frequency bands, wherein the spectral regions are each defined by at least one of the frequency bands, and wherein the analysis of the sound signal comprises using the calculated energy of the MDCT spectrum of the sound signal in the frequency bands to calculate the mean and maximum values of the energy of the MDCT spectrum.

21. The audio band-width detecting method according to claim 19, wherein the analysis of the MDCT spectrum of the sound signal comprises calculating long-term values of the mean energy values of the MDCT spectrum of the sound signal in regions amongst the number of spectral regions.

22. The audio band-width detecting method according to claim 21, wherein the analysis of the sound signal comprises increasing or decreasing counters related to the respective spectral regions in response to the long-term values of the mean energy values of the MDCT spectrum of the sound signal and the maximum values of the energy of the MDCT spectrum of the sound signal.

23. The audio band-width detecting method according to claim 22, wherein the final decision about the detected audio band-width comprises using a decision logic for switching between audio band-widths, in response to comparison between the counters and given thresholds.

24. The audio band-width detecting method according to claim 23, wherein the decision logic is also responsive to a previously decided audio band-width.

25. The audio band-width detecting method according to claim 23, wherein the final decision about the detected audio band-width comprises using a hysteresis to avoid frequent switching between audio band-widths.

26. The audio band-width detecting method according to claim 25, wherein the hysteresis used by the final decision about the detected audio band-width is shorter in case of a potential switching from a lower audio band-width to a higher audio band-width, and longer in case of a potential switching from a higher audio band-width to a lower audio band-width.

27. The audio band-width detecting method according to claim 19, wherein the analysis of the MDCT spectrum of the sound signal comprises updating counters related to the spectral regions.

28. The audio band-width detecting method according to claim 16, wherein the analysis of the MDCT spectrum sound signal is performed in frames of a given duration and is skipped in frames longer and shorter than said given duration.

29. The audio band-width detecting method according to claim 16, wherein the sound signal is a multi-channel signal including a plurality of channels, and wherein the final decision about the detected audio band-width comprises coding the detected audio band-widths of the channels as a joint parameter.

30. The audio band-width detecting method according to claim 16, wherein, in a MDCT stereo mode, the MDCT spectrum of the sound signal is analysed in the sound signal MDCT core encoding stage of the encoder part of the sound codec instead of calculating in the sound signal front pre-processing stage of the encoder part of the sound codec CLDFB (Complex Low Delay Filter Bank) values not needed in the MDCT stereo mode.

* * * * *